(12) United States Patent
Yeeles (10) Patent No.: US 7,134,210 B2
(45) Date of Patent: Nov. 14, 2006

(54) SYSTEMS AND METHODS FOR DIMENSIONALLY INSPECTING THREADED FASTENERS

(75) Inventor: Chris J. Yeeles, Renton, WA (US)

(73) Assignee: The Boeing Company, Chicago, IL (US)

(*) Notice: Subject to any disclaimer, the term of this patent is extended or adjusted under 35 U.S.C. 154(b) by 70 days.

(21) Appl. No.: 10/955,819

(22) Filed: Sep. 30, 2004

(65) Prior Publication Data

US 2006/0064886 A1    Mar. 30, 2006

(51) Int. Cl.
  G01B 21/22  (2006.01)
  G01B 5/24   (2006.01)

(52) U.S. Cl. .................... 33/199 B; 33/501.04; 33/553

(58) Field of Classification Search ............. 33/199 B, 33/199 R, 542, 543, 549, 551, 553, 554, 33/551.02, 550, 501.03, 501.04; 73/162
See application file for complete search history.

(56) References Cited

U.S. PATENT DOCUMENTS

| | | | | |
|---|---|---|---|---|
| 1,336,189 A | * | 4/1920 | Bechler | 33/829 |
| 1,357,813 A | * | 11/1920 | Olson | 33/199 R |
| 1,392,313 A | * | 10/1921 | Fallow | 33/829 |
| 1,862,145 A | * | 6/1932 | Hoke | 33/199 R |
| 1,921,899 A | * | 8/1933 | Webbeking | 33/829 |
| 1,956,812 A | * | 5/1934 | Smith | 33/199 B |
| 2,624,125 A | * | 1/1953 | Johnson | 33/199 R |
| 2,639,509 A | * | 5/1953 | Wilhelm | 33/199 B |
| 2,826,822 A | * | 3/1958 | Georges | 33/199 R |
| 2,906,029 A | * | 9/1959 | Croshier et al. | 33/829 |
| 3,111,766 A | * | 11/1963 | Bryant | 33/829 |
| 3,271,872 A | * | 9/1966 | Heslin | 33/199 R |
| 3,504,441 A | * | 4/1970 | Linley, Jr. et al. | 33/545 |
| RE29,227 E | * | 5/1977 | Fabish | 73/162 |
| 4,479,306 A | * | 10/1984 | Klementich | 33/199 R |
| 4,761,891 A | * | 8/1988 | Sugimura | 33/503 |
| 4,821,422 A | * | 4/1989 | Porter | 33/199 R |
| 4,823,396 A | | 4/1989 | Thompson | |
| 4,828,159 A | | 5/1989 | Woods | |
| 5,012,592 A | | 5/1991 | Greenslade | |
| 5,117,561 A | | 6/1992 | Greenslade | |
| 5,150,623 A | | 9/1992 | Woods | |
| 5,590,561 A | * | 1/1997 | Duta et al. | 73/162 |
| 5,727,300 A | | 3/1998 | Ekdahl et al. | |
| 5,971,860 A | | 10/1999 | Medal | |

(Continued)

FOREIGN PATENT DOCUMENTS

| | | | |
|---|---|---|---|
| JP | 11271007 A | * | 10/1999 |
| JP | 2001141444 A | * | 5/2001 |

*Primary Examiner*—R. Alexander Smith
(74) *Attorney, Agent, or Firm*—Lee & Hayes, PLLC (57) ABSTRACT

Systems and methods for obtaining dimensions for threaded fasteners are disclosed. In one embodiment, a system includes an apparatus that determines a dimension of a fastener using a probe that senses a linear displacement of the fastener. A probe tip is rotatably disposed on the probe that contacts the fastener. A controller is coupled to the apparatus for receiving the dimensional characteristic. In another embodiment, a measurement apparatus includes a rotating spindle that supports the fastener and a probe that detects a dimension and having a portion that rotatably engages the fastener. A scale is coupled to the probe to determine a displacement. In another embodiment, a method includes positioning a fastener in a spindle that rotates the fastener, engaging the fastener with a probe to sense a dimension of the fastener, the probe having a terminal portion that rotatably conforms to the fastener, and processing the dimension.

36 Claims, 5 Drawing Sheets

U.S. PATENT DOCUMENTS 6,787,724 B1     9/2004   Bennett et al.
6,810,600 B1 * 11/2004   Horwarth et al. ............. 33/645
7,003,428 B1 *   2/2006   Hart et al. .................. 702/168
2006/0064886 A1 *   3/2006   Yeeles ...................... 33/199 B

* cited by examiner

SYSTEMS AND METHODS FOR DIMENSIONALLY INSPECTING THREADED FASTENERS

FIELD OF THE INVENTION

This invention relates generally to threaded fasteners, and more particularly, to fastener inspection.

BACKGROUND OF THE INVENTION

Threaded fasteners are commonly available in a variety of sizes, thread configurations, materials and grades. In certain critical fastening applications, the dimensional tolerances of the fastener may be of significant importance. For example, selected fasteners employed in the construction of civil and military aircraft have been identified as critical to the airworthiness of the aircraft. Accordingly, these fasteners are frequently subjected to enhanced inspection procedures to ensure compliance with established government and/or commercial standards for fastener quality.

An important aspect of the inspection procedure is a determination of the conformity of the threaded fastener with established dimensional standards. In one known method, threaded fasteners may be individually dimensionally inspected using micrometers and similar devices for the measurement of a shank diameter of the fastener and/or the major and minor thread diameters of the fastener. Thread gages typically configured as a "go" or "no-go" devices may also used to accept or reject threaded fasteners that have conforming or non-conforming thread profiles, respectively. Alternately, other devices, such as an optical comparator, may also be used to inspect the thread profile.

Although the foregoing method is suitable for determining the dimensional conformity of threaded fasteners, certain drawbacks nevertheless exist. Manual inspection of relatively large lots of fasteners is generally time consuming, since a reasonable number of the fasteners must be dimensionally inspected in order to attain a statistically significant sample. Moreover, in instances where all of the fasteners in the lot must be inspected for dimensional conformity, significant amounts of inspection time are required. In either case, accurate dimensional measurements may depend upon the skill of the inspector, which may lead to variations in the dimensional data collected from a selected lot of fasteners.

Accordingly, there is a need for systems and methods for rapidly and accurately obtaining dimensional information for threaded fasteners.

SUMMARY OF THE INVENTION

The present invention comprises systems and methods for obtaining dimensional information for threaded fasteners. In one aspect, a measuring system includes a measurement apparatus that determines at least one dimensional characteristic of a fastener, such as a length or an angular dimension, with a probe that senses a linear displacement of the fastener as the fastener is moved relative to the probe. A probe tip is coupled to the probe that extends to a contact portion and permits the contact portion to rotate relative to a longitudinal axis that extends through the probe tip. A controller is coupled to the measurement apparatus for receiving the at least one dimensional characteristic.

In another aspect, a measurement apparatus includes a spindle that rotatably supports a threaded fastener, and a probe that detects a linear displacement and having a terminal portion that rotatably engages the fastener. A scale coupled to the probe to determine a linear displacement in a direction aligned with the fastener axis.

In still another aspect, a method includes positioning a fastener in a spindle that rotates the fastener about a longitudinal axis of the fastener, and engaging the fastener with a probe to sense a linear displacement corresponding to a dimension of the fastener, the probe having a terminal portion contacting the fastener that rotatably conforms to the fastener, and processing the dimension.

BRIEF DESCRIPTION OF THE DRAWINGS

Preferred and alternate embodiments of the present invention are described in detail below with reference to the following drawings.

DETAILED DESCRIPTION

The present invention relates generally relates to a systems and methods for inspecting fasteners. Many specific details of certain embodiments of the invention are set forth in the following description and in FIGS. 1 through 6 to provide a thorough understanding of such embodiments. One skilled in the art, however, will understand that the present invention may have additional embodiments, or that the present invention may be practiced without several of the details described in the following description.

Figure 1:
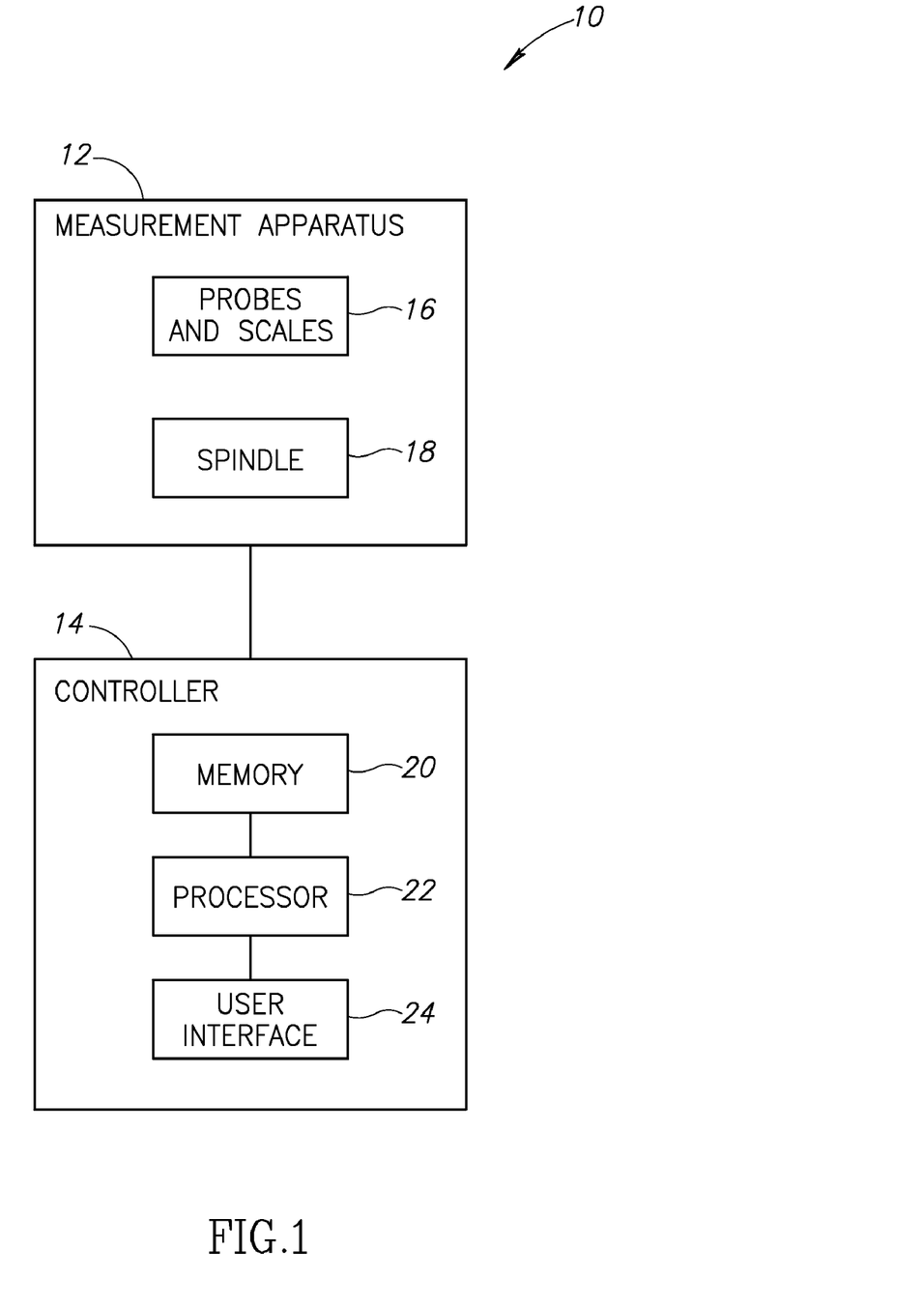
FIG. 1 is a block diagrammatic view of a measurement system for inspecting a fastener according to an embodiment of the invention.

FIG. 1 is a block diagrammatic view of a measurement system 10 for inspecting a fastener according to an embodiment of the invention. Many of the details of the system 10 are disclosed in U.S. application Ser. No. 10/294,079 (U.S. Published Application No. 2004 0093182 A1) filed Nov. 13, 2002, which application is herein incorporated by reference. The system 10 includes a measurement apparatus 12 that is coupled to a controller 14. The measurement apparatus 12 is operable to generate measurement information for a fastener undergoing inspection. Accordingly, the measurement apparatus 12 includes a first unit 16 that further includes one or more probes that engage the fastener, and scales configured to measure a force imposed on the probes as the probes engage the fastener. The measurement apparatus 12 also includes a second unit 18 that includes a spindle to support and position the fastener relative to the probes. The first unit 16 and the second unit 18 are generally configured to support and measure various threaded fasteners, such as bolts, screws and the like. One skilled in the art will readily appreciate that the measurement apparatus 12 may also be configured to accommodate threaded fasteners of different configurations. For example, the measurement apparatus 12 may be configured to support and measure various specialized threaded fasteners commonly employed in the aircraft industry, such as the well-known HI-LOK, HI-TIGUE and HI-LITE fasteners available from the Hi Shear Corporation of Torrance, Calif. The measurement apparatus 12 will be described in further detail below.

The controller 14 includes a memory 20 that is coupled to a processor 22 and a user interface 24. Prior to the inspection of a fastener in the system 10, a user may enter data pertaining to the fastener into the controller 14 using the user interface 24, which may include a keyboard, a display, a mouse, or any other interface device that allows the user to enter information into the system 10 and to further interact with the system 10. For example, the user interface 24 may also include a stored media reading device, such as a tape drive, a magnetic disk drive, or an optical disk drive operable to read the data for the fastener from a stored media device that is inserted into the reader.

When a fastener is inserted into the spindle of the second unit 18, the probes and scales of the first unit 16 and the spindle are manipulated by the controller 14 to perform dimensional measurements and generate inspection information for the fastener. For example, the dimensional measurements may include the determination of a major diameter, a minor diameter, and a mean diameter. The dimensional measurements may also include one or more angular measurements, including a thread pitch and a thread angle. The inspection information generated by the apparatus 12 is transferred to the processor 22, which may perform pre-programmed numerical routines, including the generation and compilation of statistical information based upon the acquired dimensional information. The processor 22 may also perform pre-programmed comparison routines wherein the dimensional measurements are compared to previously stored data pertaining to the fastener. In a particular embodiment, the processor 22 is configured to continuously generate measurement information and directly provide the information to the user using a visual display device, a printer, or other similar devices.

Figure 2:
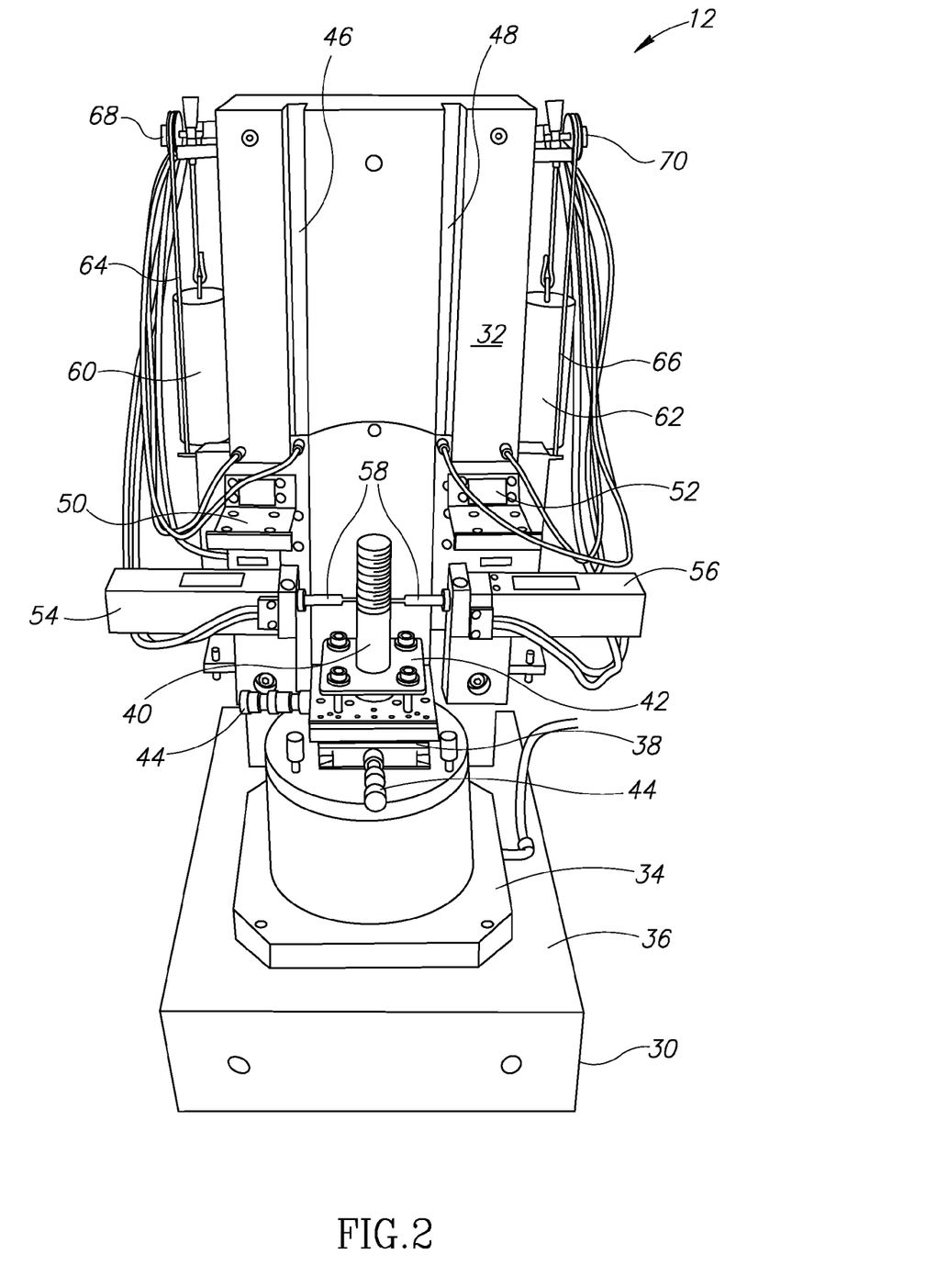
FIG. 2 is an isometric view of the measurement apparatus of FIG. 1.

FIG. 2 is an isometric view of the measurement apparatus 12 of FIG. 1 that will be used to describe the measurement apparatus 12 in greater detail. The apparatus includes a first base section 30 configured to be positioned on a support surface, such as a floor, and a second base section 32 that is coupled to the first base section 30 and oriented perpendicular the first base section 30 to comprise a generally L-shaped structure. The first base section 30 and the second base section 32 are generally comprised of a material having a relatively high density, which is substantially resistant to thermal expansion, such as granite, or other similar materials. A spindle 34 is positioned on a support portion 36 of the first section 30. The spindle 34 supports a rotational surface 38 that rotates a fastener 40 that is retained on the rotational surface 38 by a mounting plate 42. The spindle 34 is operable to accurately resolve angular positions so that rotational information of high accuracy may be generated. In one particular embodiment, the spindle 34 is a precision air-bearing spindle with greater than 0.001 arc-second resolution and at least about 3 arc-second accuracy. Spindles having this level of resolution and accuracy are commercially available from the Nelson Air Corporation of Milford, N.H., although other alternatives exist. The spindle 34 further includes a digital data port that is electrically coupled to the controller 14 of FIG. 1 so that digital data may be conveniently transferred. The spindle 34 also includes a pair of manual vernier adjustment devices 44 for adjusting the position of the fastener 40 relative to the spindle 34.

Still referring to FIG. 2, for geometrical reference, an x-axis is substantially parallel to the spinning surface of the spindle 34 and the surface of the second base section 32 that faces the spindle 34. A z-axis is substantially parallel to the surface of the second section 32 and substantially perpendicular to the mounting surface of the spindle 34. The second base section 32 includes a first vertical track 46 and a second vertical track 48. The first track 46 and the second track 48 are approximately equidistant along the x-axis direction from a centerline that projects outwardly through the spindle 34 and is substantially parallel to the z-axis. The first track 46 and the second track 48 slidably receive a first scale 50 and a second scale 52, respectively. The first scale 50 and the second scale 52 generate z-axis dimensional information based upon the position of the first scale 50 on the track 46 and the second scale 52 on the track 48. The generated z-axis information is transferred to the controller 14. In another particular embodiment of the present invention, the first scale 50 and the second scale 52 may be air-bearing scales having better than 0.2 micro-inch resolution. Suitable air bearing scales are commercially available from the Nelson Air Corporation of Milford, N.H., although other alternatives exist.

The first scale 50 and the second scale 52 are coupled to a first probe 54 and a second probe 56, respectively. The first probe 54 and the second probe 56 are oriented so that a longitudinal axis that projects through the first probe 54 and the second probe 56 is approximately parallel with the x-axis. The first probe 54 and the second probe 56 are configured to couple to probe tips 58 that project inwardly towards the fastener 40. The first probe 54 and the second probe 56 are operable to accurately resolve linear displacements transferred from the fastener 40 to the first probe 54 and the second probe 56 through the probe tips 58. In a particular embodiment, the first probe 54 and the second probe 56 are air-activated probes with better than 0.2 micro-inch resolution commercially available from the Heidenhain Corporation of Schaumburg, Ill., although other alternatives exist.

The first scale 50 and the probe 54, and the second scale 52 and the probe 56 are counterbalanced in order to approximately neutralize the weight of the scale 50 and the probe 54, and the scale 52 and the probe 56. Accordingly, a first counterweight 60 and a second counterweight 62 are suitably coupled respectively with the first scale 50 and the second scale 52 through first and second cables 64 and 66 that pass over respective first and second pulleys 68 and 70. The first and second pulleys 68 and 70 are suitably attached to respective sides of the second section 32. Consequently, the first scale 50 and the second scale 52 are counterbalanced and may translate along the first track 46 and the second track 48 based solely upon a vertically-directed force imparted to the probe tips 58 by a threaded portion of the fastener 40. In another embodiment of the invention, the second section 32 is positioned on a horizontal supporting surface, such as a floor, so that an axis of the fastener 40 projects in a horizontal direction. As a result, the first scale 50 and the second scale 52 advantageously do not require counterbalancing.

Figure 3:
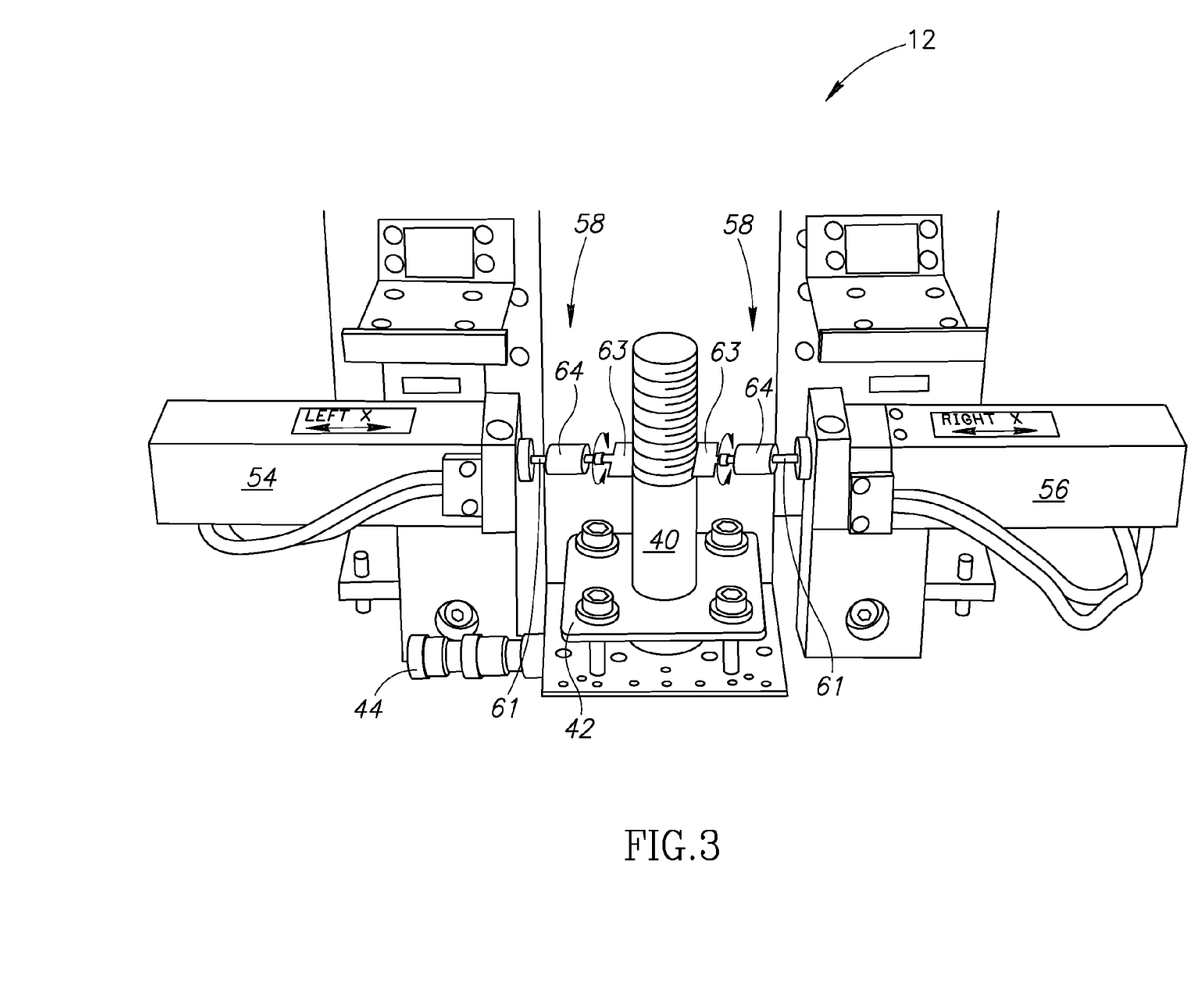
FIG. 3 is a partial isometric view of the apparatus of FIG. 2 that illustrates a probe tip in accordance with another embodiment of the invention.

FIG. 3 is a partial isometric view of the apparatus 12 of FIG. 2 that illustrates the probe tip 58 in accordance with another embodiment of the invention. The probe tip 58 includes a threaded stop 61 that is configured to engage a corresponding threaded portion on the first probe 54 and the second probe 56, respectively. An opposing end of the probe tip 58 further includes a blade portion 63 that engages a threaded portion of the fastener 40, or still other portions of the fastener 40, such as a shank portion. The blade portion 63 will be discussed in greater detail below. A pivotal portion 64 is interposed between the threaded stop 61 and the blade portion 63 that permits the blade portion 63 to freely rotate about an axis extending through the probe tip 58. Accordingly, the pivotal portion 64 permits the blade portion 63 to advantageously and adjustably conform to geometrical variations present in the threaded portion of the fastener 40 as it is subjected to an inspection procedure, thus producing inspection information having greater accuracy. The pivotal portion 64 will also be described in further detail below.

Figure 4:
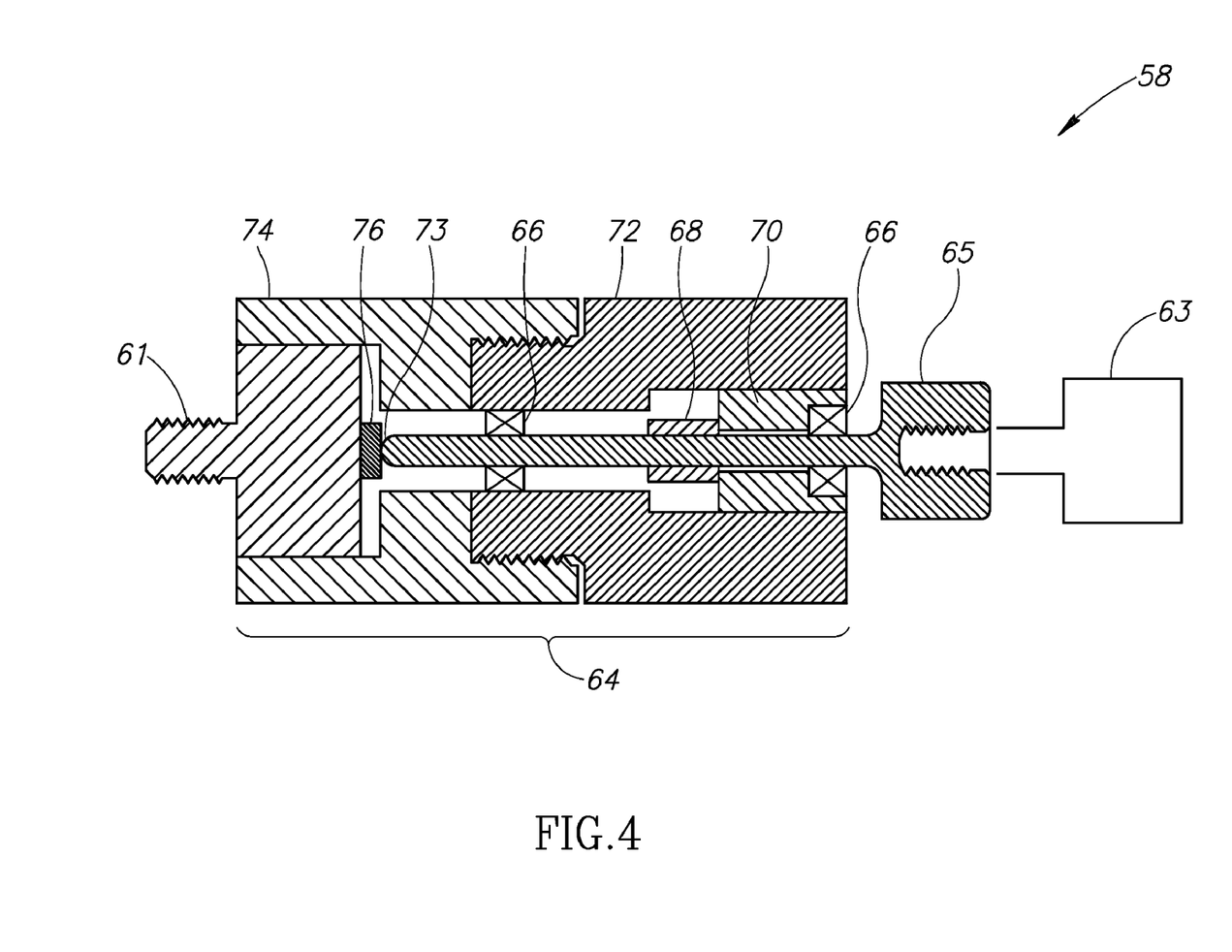
FIG. 4 is a cross sectional view of the probe tip of FIG. 3 that will be used to describe the probe tip in further detail.

FIG. 4 is a cross sectional view of the probe tip 58 of FIG. 3 that will be used to describe the probe tip 58 in further detail. The probe tip 58 includes an axial shaft 65 that extends into the pivotal portion 64 and that is configured to threadably engage the blade portion 63. The axial shaft 65 is supported by a pair of bearings 66 positioned within the pivotal portion 64. The bearings 66 may be conventional anti-friction bearings, but preferably, the bearings 66 are jeweled bearings having a hard, mineral material such as a ruby, or a sapphire to provide a low-friction support. The axial shaft 65 is retained within the pivotal portion 64 by a collar 68 that is fixedly positioned on the axial shaft 65. The collar 68 may be fixedly positioned on the shaft 65 by providing an interference fit between the collar 68 and the axial shaft 65. Alternately, the collar 68 may be fixedly positioned on the shaft 65 using various adhesive compounds. A bearing retainer 70 is positioned on the axial shaft 65 that retains the bearing 66 within the pivotal portion 64.

Still referring to FIG. 4, the pivotal portion 64 includes a free-play adjuster 72 that is threadably received into a barrel portion 74 to a desired depth to allow a rounded end 73 of the axial shaft 65 to contact a thrust plate 76 so that any axial free-play in the probe tip 58 is eliminated. The thrust plate 76 may be comprised of any suitably hard, rigid material such as tungsten or other like materials so that the probe tip 58 does not develop a significant amount of axial free-play when in use. The barrel portion 74 also receives the threaded stop 61, which is retained within the barrel portion 74 by an interference fit between the barrel portion 74 and the stop 61.

Figure 5:
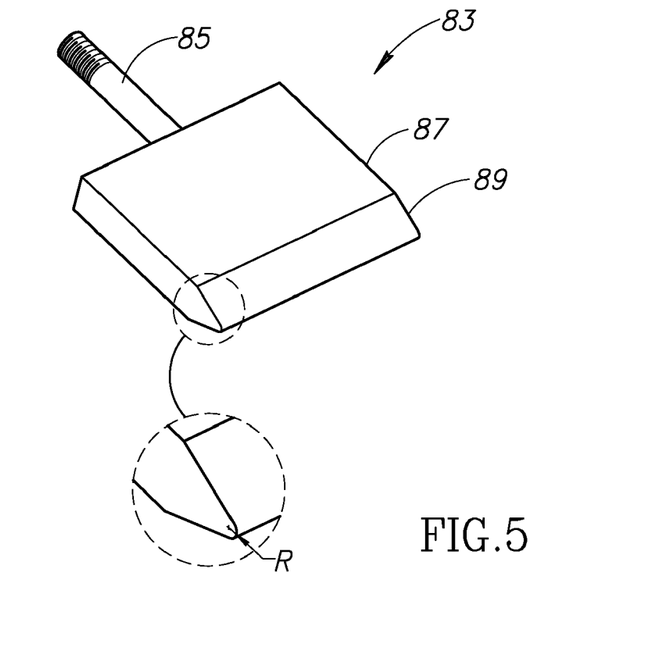
FIG. 5 is an isometric view of a blade portion for the probe tip of FIG. 4 according to still another embodiment of the invention.

FIG. 5 is an isometric view of a blade portion 83 for the probe tip 58 of FIG. 4 according to still another embodiment of the invention. The blade portion 83 includes a threaded rod 85 configured to threadably engage the axial shaft 65 that is coupled to a planar portion 87 having a tapered engagement portion 89. Depending on the configuration of the threaded portion of the fastener 40 (FIG. 2 and FIG. 3), the tapered engagement portion 89 may taper to a relatively acute edge, such as a knife edge, or it may taper to an edge that has a predetermined radius R, as shown in FIG. 5.

Figure 6:
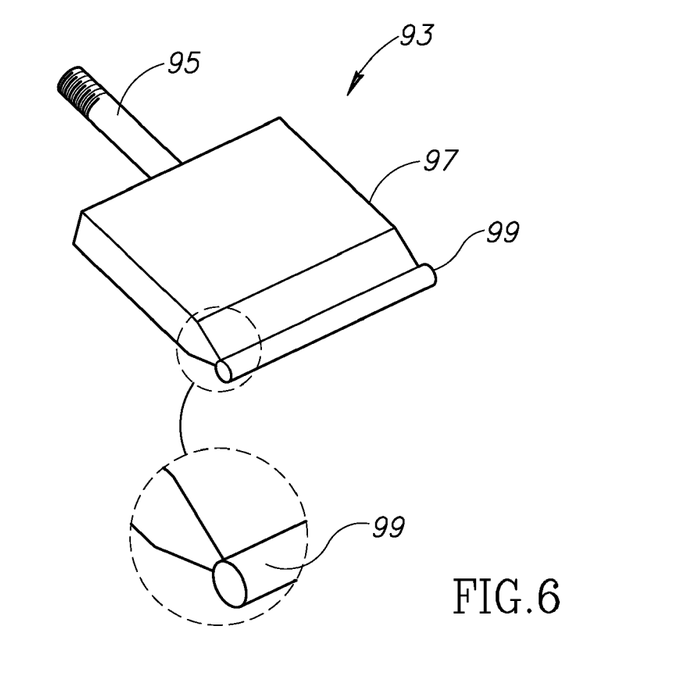
FIG. 6 is an isometric view of a blade portion for the probe tip of FIG. 4 according to still yet another embodiment of the invention.

FIG. 6 is an isometric view of a blade portion 93 for the probe tip 58 of FIG. 4 according to still yet another embodiment of the invention. In this embodiment, the blade portion 93 includes a threaded rod 95 configured to threadably engage the axial shaft 65 that is coupled to a planar portion 97. The planar portion 97 is coupled to an engagement portion 99 generally comprised of a cylinder having a predetermined diameter configured to engage the threaded portion of the fastener 40 (as shown in FIG. 2 and FIG. 3).

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A measuring system, comprising:
   a measurement apparatus operable to determine at least one dimensional characteristic of a fastener, the apparatus including a probe that is configured to sense a linear displacement of the fastener as the fastener is moved relative to the probe;
   a controller coupled to the measurement apparatus for receiving the at least one dimensional characteristic; and
   a probe tip coupled to the probe at one end and extending to a contact portion at an opposing end, the contact portion contacting the fastener at a selected location while the at least one dimensional characteristic is determined, the probe tip being further configured to permit the contact portion to rotate relative to a longitudinal axis that extends through the probe tip, wherein the probe tip comprises a pivotal portion coupled between the probe and the contact portion.

2. The measuring system of claim 1, wherein the pivotal portion further comprises an axial shaft coupled to the probe that extends into the pivotal portion.

3. The measuring system of claim 2, wherein the pivotal portion further comprises at least one anti-friction bearing that supports the axial shaft within the pivotal portion.

4. The measuring system of claim 1, wherein the contact portion further comprises a blade portion that contacts the fastener at the selected location.

5. The measuring system of claim 4, wherein the blade portion further comprises a tapered engagement portion that tapers to an acute edge that contacts the fastener at the selected location.

6. The measuring system of claim 4, wherein the blade portion further comprises a tapered engagement portion having a predetermined radius that contacts the fastener at the selected location.

7. The measuring system of claim 4, wherein the blade portion further comprises a tapered engagement portion including a cylinder having a predetermined diameter that contacts the fastener at the selected location.

8. The measuring system of claim 1, wherein the measurement apparatus further comprises a spindle configured to at least one of rotate the fastener and indicate an angular position of the fastener.

9. The measuring system of claim 1, wherein the measurement apparatus further comprises a scale coupled to the probe that is operable to indicate a linear displacement along an axis approximately perpendicular to an axis that extends longitudinally through the probe.

10. The measuring system of claim 1, wherein the controller further comprises a processor that is coupled to a memory and a user interface.

11. The measuring system of claim 10, wherein the processor is operable to perform statistical processing on the at least one dimensional characteristic.

12. The measuring system of claim 10, wherein the memory is operable to store dimensional information for the fastener.

13. The measuring system of claim 10, wherein the user interface includes at least one of a keyboard, a display and a mouse.

14. A measurement apparatus for determining a dimensional characteristic of a threaded fastener, comprising:
   a spindle configured to rotatably support the fastener in a first direction aligned with a longitudinal axis of the fastener;

at least one probe operable to detect a linear displacement in a second direction approximately perpendicular to the first direction and having a terminal portion that rotatably engages the fastener; and a scale coupled to the at least one probe that is operable to determine a linear displacement in the first direction.

15. The measurement apparatus of claim 14, wherein the terminal portion further comprises a pivotal portion interposed between the probe and the fastener.

16. The measurement apparatus of claim 15, wherein the pivotal portion further comprises an axial shaft coupled to the probe that extends into the pivotal portion.

17. The measurement apparatus of claim 16, wherein the pivotal portion further comprises at least one anti-friction bearing that supports the axial shaft within the pivotal portion.

18. The measurement apparatus of claim 16, wherein the pivotal portion further comprises a thrust plate that contacts an end portion of the axial shaft.

19. The measurement apparatus of claim 16, wherein the terminal portion further includes a tapered engagement portion that tapers to an edge having a cylinder with a predetermined diameter that contacts the fastener.

20. The measurement apparatus of claim 15, wherein the terminal portion further comprises a blade portion that contacts the fastener.

21. The measurement apparatus of claim 20, wherein the blade portion further comprises a tapered engagement portion that tapers to an acute edge that contacts the fastener.

22. The measurement apparatus of claim 20, wherein the blade portion further comprises a tapered engagement portion having a predetermined radius that contacts the fastener.

23. The measurement apparatus of claim 20, wherein the blade portion further comprises a tapered engagement portion including a cylinder having a predetermined diameter that contacts the fastener.

24. A method of determining a dimensional characteristic of a threaded fastener, comprising:

positioning a fastener in a spindle configured to rotate the fastener about a longitudinal axis of the fastener;

engaging the fastener with at least one probe operable to sense a linear displacement corresponding to the dimensional characteristic, the probe having a terminal portion contacting a selected portion of the fastener that rotatably conforms to the selected portion, wherein the probe tip comprises a pivotal portion coupled between the probe and the contact portion; and processing the dimensional characteristic.

25. The method of claim 24, wherein engaging the fastener with at least one probe operable to sense a linear displacement further comprises engaging a threaded portion of the fastener with the at least one probe.

26. The method of claim 25, wherein engaging a threaded portion of the fastener further comprises determining at least one of a major diameter, a minor diameter and a mean diameter.

27. The method of claim 25, wherein engaging a threaded portion of the fastener further comprises determining at least one of a thread pitch angle and a thread angle.

28. The method of claim 24, wherein engaging the fastener with at least one probe operable to sense a linear displacement further comprises engaging a shank portion of the fastener with the at least one probe.

29. The method of claim 24, wherein processing the dimensional characteristic further comprises executing a computer program to generate statistical data for the fastener.

30. The method of claim 24, wherein processing the dimensional characteristic further comprises executing a computer program to compare the dimensional information to a reference value stored in a memory device, and generating a value corresponding to the comparison.

31. The method of claim 30, further comprising displaying the comparison on a visual display device.

32. The method of claim 24, wherein positioning a fastener in a spindle further comprises retaining the fastener on mounting plate tat is coupled to a rotational surface.

33. The method of claim 24, wherein engaging the fastener with at least one probe further comprises contacting the selected portion with a blade portion coupled to the probe.

34. The method of claim 33, wherein contacting the selected portion with a blade portion coupled to the probe further comprises engaging a threaded portion of the fastener with a tapered engagement portion that tapers to an acute edge.

35. The method of claim 33, wherein contacting the selected portion with a blade portion coupled to the probe further comprises engaging a threaded portion of the fastener with a tapered engagement portion having a predetermined radius.

36. The method of claim 33, wherein contacting the selected portion with a blade portion coupled to the probe further comprises engaging a threaded portion of the fastener with a tapered engagement portion that includes a cylinder having a predetermined diameter.

* * * * *